United States Patent
Gubbi Lakshminarasimha et al.

(10) Patent No.: US 12,400,434 B2
(45) Date of Patent: Aug. 26, 2025

(54) METHOD AND SYSTEM FOR IDENTIFYING AND MITIGATING BIAS WHILE TRAINING DEEP LEARNING MODELS

(71) Applicant: Tata Consultancy Services Limited, Mumbai (IN)

(72) Inventors: Jayavardhana Rama Gubbi Lakshminarasimha, Bangalore (IN); Vartika Sengar, Bangalore (IN); Vivek Bangalore Sampathkumar, Bangalore (IN); Gaurab Bhattacharya, Bangalore (IN); Balamuralidhar Purushothaman, Bangalore (IN); Arpan Pal, Kolkata (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 342 days.

(21) Appl. No.: 18/209,094

(22) Filed: Jun. 13, 2023

(65) Prior Publication Data
US 2024/0013522 A1 Jan. 11, 2024

(30) Foreign Application Priority Data
Jul. 8, 2022 (IN) .............................. 202221039396

(51) Int. Cl.
*G06V 10/776* (2022.01)
*G06N 3/0455* (2023.01)
(Continued)

(52) U.S. Cl.
CPC ......... *G06V 10/776* (2022.01); *G06N 3/0455* (2023.01); *G06N 3/08* (2013.01);
(Continued)

(58) Field of Classification Search
CPC .... G06V 10/776; G06V 10/774; G06V 10/82; G06V 10/764; G06V 10/7715;
(Continued)

(56) References Cited

U.S. PATENT DOCUMENTS 8,934,722 B2 * 1/2015 Peleg ...................... G06F 18/41
382/224
10,540,572 B1 * 1/2020 Kim ........................ G06N 3/048
(Continued)

OTHER PUBLICATIONS

"Counterfactual Generative Networks"; Sauer, Axel, Published at ICLR 2021, arXiv:2101.06046v1 [cs. LG] Jan. 15, 2021 (Year: 2021).*
(Continued)

*Primary Examiner* — Michael S Osinski
(74) *Attorney, Agent, or Firm* — Finnegan, Henderson, Farabow, Garrett & Dunner, LLP

(57) ABSTRACT

This disclosure relates generally to identification and mitigation of bias while training deep learning models. Conventional methods do not provide effective methods for bias identification, and they require pre-defined concepts and rules for bias mitigation. The embodiments of the present disclosure train an auto-encoder to produce a generalized representation of an input image by decomposing into a set of latent embedding. The set of latent embedding are used to learn the shape and color concepts of the input image. The feature specialization is done by training an auto-encoder to reconstruct the input image using the shape embedding modulated by color embedding. To identify the bias, permutation invariant neural network is trained for classification task and attribution scores corresponding to each concept embedding are computed. The method also performs de-biasing the classifier by training it with a set of counterfactual images generated by modifying the latent embedding learned by the auto-encoder.

12 Claims, 9 Drawing Sheets

(51) Int. Cl.
*G06N 3/08* (2023.01)
*G06T 11/00* (2006.01)
*G06V 10/774* (2022.01)
*G06V 10/82* (2022.01)

(52) U.S. Cl.
CPC .......... *G06T 11/001* (2013.01); *G06V 10/774* (2022.01); *G06V 10/82* (2022.01)

(58) Field of Classification Search
CPC .. G06V 10/454; G06V 10/762; G06N 3/0455; G06N 3/08; G06N 3/084; G06N 3/045; G06N 3/047; G06N 3/088; G06N 3/04; G06N 3/044; G06N 3/0464; G06N 3/09; G06N 3/096; G06N 3/082; G06N 20/10; G06T 11/001; G06T 2207/20084; G06T 2207/20081; G06T 7/11; G06F 18/22; G06F 17/18; G06F 18/2148; G06F 18/23; G06F 18/24; G06F 18/2431; G06F 16/583; G06F 18/2113; G06F 18/2115

See application file for complete search history.

(56) References Cited

U.S. PATENT DOCUMENTS

| | | | | |
|---|---|---|---|---|
| 10,650,276 | B1* | 5/2020 | Florez Choque | G06N 3/084 |
| 11,341,699 | B1* | 5/2022 | Gottlieb | G06N 3/047 |
| 11,620,530 | B2* | 4/2023 | Katoh | G06N 3/084 |
| | | | | 706/25 |
| 12,039,647 | B1* | 7/2024 | Gottlieb | G06N 3/047 |
| 12,045,723 | B2* | 7/2024 | Cho | G06N 3/04 |
| 12,277,753 | B1* | 4/2025 | Bharaj | G06V 10/751 |
| 2014/0376804 | A1* | 12/2014 | Akata | G06F 18/21345 |
| | | | | 382/159 |
| 2017/0061276 | A1* | 3/2017 | Riley | G06N 3/045 |
| 2018/0053042 | A1* | 2/2018 | Philbin | G06N 3/08 |
| 2018/0225823 | A1* | 8/2018 | Zhou | G06T 7/11 |
| 2018/0322371 | A1* | 11/2018 | Dupont De Dinechin | G06V 10/7753 |
| 2019/0164047 | A1* | 5/2019 | ter Haar Romenij | G06V 10/764 |
| 2019/0266487 | A1* | 8/2019 | Chollet | G06V 20/00 |
| 2019/0318207 | A1* | 10/2019 | Lo | G05D 1/0088 |
| 2020/0020097 | A1* | 1/2020 | Do | G06F 18/2413 |
| 2020/0193552 | A1* | 6/2020 | Turkelson | G06F 18/24143 |
| 2020/0342328 | A1* | 10/2020 | Revaud | G06F 18/22 |
| 2020/0401929 | A1* | 12/2020 | Duerig | G06N 5/02 |
| 2021/0056444 | A1* | 2/2021 | Shimazu | G06N 20/00 |
| 2021/0142068 | A1* | 5/2021 | Aliamiri | G06V 20/47 |
| 2021/0265043 | A1* | 8/2021 | Haghighi | G16H 50/20 |
| 2021/0342570 | A1* | 11/2021 | Gregson | G06N 3/084 |
| 2021/0342642 | A1* | 11/2021 | Shabtay | G06V 10/774 |
| 2021/0365732 | A1* | 11/2021 | Lin | G06T 7/11 |
| 2021/0406712 | A1 | 12/2021 | Bhide et al. | |
| 2022/0121934 | A1* | 4/2022 | Duan | G06N 3/045 |
| 2022/0138454 | A1* | 5/2022 | Zhao | G06F 18/214 |
| | | | | 382/156 |
| 2022/0156577 | A1* | 5/2022 | Jha | G06N 3/08 |
| 2022/0172416 | A1* | 6/2022 | Kuta | G06F 21/6254 |
| 2022/0237449 | A1* | 7/2022 | Chung | G06F 18/214 |
| 2022/0335256 | A1* | 10/2022 | Saraee | G06F 18/22 |
| 2022/0366040 | A1* | 11/2022 | Marbouti | G06N 3/084 |
| 2023/0071442 | A1* | 3/2023 | Tripathy | G06F 18/29 |
| 2023/0085127 | A1* | 3/2023 | Byun | G06N 3/0464 |
| | | | | 382/157 |
| 2023/0177348 | A1* | 6/2023 | Yoo | G06V 10/774 |
| | | | | 382/156 |
| 2023/0237333 | A1* | 7/2023 | Shao | G06V 10/762 |
| | | | | 706/25 |
| 2023/0281826 | A1* | 9/2023 | Schulter | G06V 10/761 |
| | | | | 382/173 |
| 2023/0281958 | A1* | 9/2023 | Mopur | G06N 3/0455 |
| | | | | 382/155 |
| 2023/0281978 | A1* | 9/2023 | Gowda | G06N 3/045 |
| | | | | 382/199 |
| 2023/0351203 | A1* | 11/2023 | Ozay | G06N 3/096 |
| 2024/0005531 | A1* | 1/2024 | Seo | G06T 7/248 |
| 2024/0013516 | A1* | 1/2024 | Vasudevan | G06V 10/7715 |
| 2025/0162612 | A1* | 5/2025 | Woelki | B60W 60/00274 |
| 2025/0217446 | A1* | 7/2025 | Xu | G06F 18/214 |

OTHER PUBLICATIONS

Amini et al., "Uncovering and Mitigating Algorithmic Bias through Learned Latent Structure," (2019).

Dash et al., "Evaluating and Mitigating Bias in Image Classifiers: A Casual Perspective Using Counterfactuals," (2022).

* cited by examiner

METHOD AND SYSTEM FOR IDENTIFYING AND MITIGATING BIAS WHILE TRAINING DEEP LEARNING MODELS

PRIORITY CLAIM

This U.S. patent application claims priority under 35 U.S.C. § 119 to: Indian Patent Application Number. 202221039396, filed on Jul. 8, 2022. The entire contents of the aforementioned application are incorporated herein by reference.

TECHNICAL FIELD

The disclosure herein generally relates to the field of bias identification and mitigation and more particularly, to a method and system for identifying and mitigating bias while training deep learning models.

BACKGROUND

Deep learning has made significant progress in recent years, surpassing human performance in many computer vision tasks from image classification to image summarization. Many established representation backbones such as ResNet, Inception, VGGNet (Visual Geometry Group Very Deep Convolutional Network) are available to capture data-driven features at various scales. New solutions have been developed using sophisticated algorithms which include attention, domain adaptation and low-shot learning with a variety of challenging datasets. These methods are data-hungry and with annotated data available in large quantities, they are handy for real-world deployment. However, they pose significant challenges in proving they are trustworthy. These methods are vulnerable to adversarial perturbation. Further, the algorithms suffer from lack of explainability and causal analysis poses a great challenge. Dependency on well curated datasets is yet another bottleneck that affects real-world deployment. All these challenges are being addressed widely in computer vision and machine learning community.

Color and shape are the two fundamental attributes in image analysis and representation. In the context of deep learning, a first set of layers captures color and texture information when trained on large domain-specific natural datasets. When relatively smaller datasets are considered and networks are trained from scratch, the bias in the data seeps into the trained network resulting in a biased model. Once the low-level features are not accurately captured, training subsequent layers will result in generating a highly biased model. A very common example to illustrate this is the ColorMNIST dataset (From published paper titled "Learning not to learn: Training deep neural networks with biased data" authored by "B. Kim, H. Kim, K. Kim, S. Kim, and J. Kim" published in "CVPR, pages 9012-9020, 2019"), where every digit in the training set has unique color but at the time of testing, colors of digits are either shuffled or inverted. In this case, even when the training accuracy is very high, it has been shown that the network fails to classify the digits accurately as it has used color information at the time of training rather than shape. Visual Explanation methods like GradCAM (From published paper titled "Grad-cam: Visual explanations from deep networks via gradient based localization" authored by "R R Selvaraju, M. Cogswell, A. Das, R. Vedantam, D. Parikh, and D. Batra" published in "ICCV, pages 618-626, 2017") etc. have been employed to understand how a deep learning (DL) model makes decision. Even though the class activation map captures the correct region on the ii age, but these methods can't provide concept-level understanding of model's prediction. For example, in ColorMNIST case, the mod& results in erroneous classification as the concept being used to classify is wrong i.e., use of color instead of shape.

There are multiple approaches to address this challenge. Data augmentation reduces the effect of certain types of biases. There are other bias mitigation strategies which either require explicit bias labels or use assumptions for de-biasing. Most of the above methods require human intervention where the biases are identified by the human expert. From explainability perspective, visual explanation methods like GradCAM, SmoothGrad, Integrated Gradients, etc. describe how important each pixel was in the final model's classification/prediction. These visual explanations cannot provide concept-level understanding of the model's prediction and using them directly is not sufficient. In ColorMNIST use case, such techniques fall short in terms of identification of confounding factors. Concept Activation Vectors have been introduced that help in having humanlike control over the model learning. In this case, low-level concepts such as color and texture are combined with intermediate-level concepts such as parts of the body. The intermediate level of concepts is finally combined with higher-level concepts such as human body. This is in line with human intuition and helps in quantifying the degree to which a user-defined concept is important in the final classification. Again, this approach assumes that the trained network is not biased and encompasses every concept the human envisages. Another approach is based on the neuro-symbolic artificial intelligence (NSAI) to understand the bias present in the network and can also take mitigation steps to reduce the effect of bias. Although NSAI-based architectures give advantages of explainability at the semantic level and can even work with limited data settings, prior knowledge of the task is required. The set of symbols, concepts and rules required to solve the task should be known and clearly defined. Pre-defining concepts and rules also limit the modelling capacity.

SUMMARY

Embodiments of the present disclosure present technological improvements as solutions to one or more of the above-mentioned technical problems recognized by the inventors in conventional systems. For example, in one embodiment, a method for identifying and mitigating bias while training deep learning models is provided. The method includes: receiving a set of training images as input; training an auto-encoder using the set of training images, wherein the auto-encoder comprises an encoder and a decoder; generating a set of latent embedding from an encoder of the trained auto-encoder; computing an attribution score by calculating integrated gradient for each of the latent embedding amongst the set of latent embedding using a trained permutation invariant neural network, wherein the permutation invariant neural network is trained using the set of latent embedding from the encoder of the trained auto-encoder; identifying bias associated with the set of training images utilizing the attribution score for each of the latent embedding; generating a set of counterfactual images using the trained auto-encoder by modifying the set of latent embedding, wherein modifying the set of latent embedding is based on the calculated attribution score of the bias associated with the set of training images; and training classifiers for image classification using the set of training images and the set of counterfactual images.

In another aspect, a system for identifying and mitigating bias while training deep learning models is provided. The system comprises memory storing instructions; one or more communication interfaces; and one or more hardware processors coupled to the memory via the one or more communication interfaces, wherein the one or more hardware processors are configured by the instructions to receiving a set of training images as input; training an auto-encoder using the set of training images, wherein the auto-encoder comprises an encoder and a decoder; generating a set of latent embedding from an encoder of the trained auto-encoder; computing an attribution score by calculating integrated gradient for each of the latent embedding amongst the set of latent embedding using a trained permutation invariant neural network, wherein the permutation invariant neural network is trained using the set of latent embedding from the encoder of the trained auto-encoder; identifying bias associated with the set of training images utilizing the attribution score for each of the latent embedding; generating a set of counterfactual images using the trained auto-encoder by modifying the set of latent embedding, wherein modifying the set of latent embedding is based on the calculated attribution score of the bias associated with the set of training images; and training classifiers for image classification using the set of training images and the set of counterfactual images.

In an embodiment, wherein the set of latent embedding comprises a set of shape embedding and a set of color embedding, In an embodiment, wherein the training of the auto-encoder comprises: generating a set of modulated features by performing modulation between the set of shape embedding and the set of color embedding; reconstructing a set of multi-resolution frequency components by feeding the set of modulated features to a decoder of the auto-encoder wherein the set of multi-resolution frequency components corresponds to a set of channels associated with the set of training images; reconstructing the set of training images by applying an inverse operation on the set of multi-resolution frequency components to generate a set of reconstructed images; and training the auto-encoder using a reconstruction loss wherein the reconstruction loss is computed using the set of training images and the set of reconstructed images.

In an embodiment, wherein the step of identifying the bias associated with the set of training images comprises detecting a set of specialized features resulting in the bias from the attribution score calculated using integrated gradients.

In yet another aspect, there is provided a computer program product comprising a non-transitory computer readable medium having a computer readable program embodied therein, wherein the computer readable program, when executed on a computing device causes the computing device for identifying and mitigating bias while training deep learning models by receiving a set of training images as input; training an auto-encoder using the set of training images, wherein the auto-encoder comprises an encoder and a decoder; generating a set of latent embedding from an encoder of the trained auto-encoder; computing an attribution score by calculating integrated gradient for each of the latent embedding amongst the set of latent embedding using a trained permutation invariant neural network, wherein the permutation invariant neural network is trained using the set of latent embedding from the encoder of the trained auto-encoder; identifying bias associated with the set of training images utilizing the attribution score for each of the latent embedding; generating a set of counterfactual images using the trained auto-encoder by modifying the set of latent embedding, wherein modifying the set of latent embedding is based on the calculated attribution score of the bias associated with the set of training images; and training classifiers for image classification using the set of training images and the set of counterfactual images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
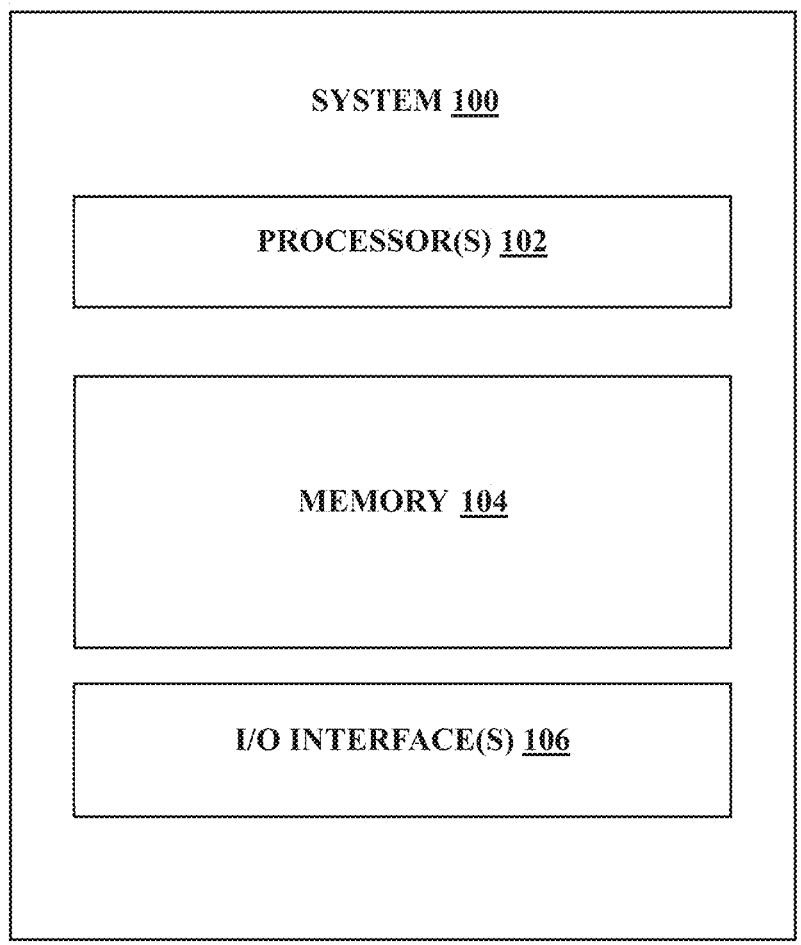
FIG. 1 illustrates an exemplary block diagram of a system for identifying and mitigating bias while training deep learning models, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for identifying and mitigating bias while training deep learning models. The present disclosure automatically detects the bias during training of a deep neural network by introducing concept mining and de-bias the deep neural network so that the low-level concepts are accurately identified for a given task. The disclosed method mine the low-level concepts without external bias annotations. This is achieved by converting the distributed representation of any backbone neural network into a set of disentangled concepts. These concepts are task-independent and can be used to train a neural network-based classifier for any downstream task. In the present disclosure, a permutation invariant neural network (e.g., set transformer) is trained for the classification task. The permutation invariant neural network (e.g., set transformer) takes the discovered set of concepts as inputs to give the final class prediction. These mined concepts are used in the detection of confounding factors and biases. After the detection of bias, the same backbone neural network can be used in the bias mitigation strategy. The disclosed method for bias identification is model agnostic and it can be used to eliminate the bias while training any model for a given task.

Existing bias mitigation strategies are broadly categorized into two groups: (a) methods that require explicit bias labels during training; (b) methods that do de-biasing implicitly without bias labels. There are many ways in which explicit bias labels can be utilized during training. In one, weights can be assigned during sampling or loss computation. Higher weights can also be given to minority samples either statistically or dynamically or in groups. Another way is through creating an ensemble wherein one branch is trained to predict using only biased features and another branch, a de-biased one, trains on samples on which the first branch does not predict well. Another category of approaches, like two-branch setup in ensemble based methods, is adversarial de-biasing, where encoder in main branch is penalized if bias prediction branch is successful at predicting biases from them.

Implicit bias mitigation methods have been developed, since knowing the bias labels in advance is not always possible. In these methods, prior knowledge of bias is not required. In limiting capacity models, constraints are put on the training itself like lower number of epochs, fewer model parameters etc. Gradient starvation methods, on the other hand, rely only on simpler features that can be explained using statistical methods. Although these methods do not assume any prior knowledge of bias, these methods assume that by limiting the capacity in some way, either by training parameters or by features, identifiable biases can be mitigated. These methods do not explain exactly which features caused the bias. The present disclosure explicitly detects the bias and mitigates the same. Herein concept mining is performed wherein bias concepts are automatically detected before mitigation, Referring now to the drawings, and more particularly to FIG. 1 through FIG. 7B, where similar reference characters denote corresponding features consistently throughout the figures, there are shown preferred embodiments and these embodiments are described in the context of the following exemplary system and/or method.

FIG. 1 illustrates a system 100 for identifying and mitigating bias while training deep learning models. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the 110 interface(s) can include one or more ports for connecting a number of devices to one another or to another server.

The memory 104 may include any computer-readable medium known in the art including, for example, volatile memory, such as static random-accessory (SRAM) and dynamic random-access memory (DRAM), and/or non-volatile memory, such as read only memory (ROM), erasable programmable ROM, flash memories, hard disks, optical disks, and magnetic tapes.

In an embodiment of the present disclosure, the one or more processors 102 are configured to receive at step 202, a set of training images as input. In an embodiment of the present disclosure, the one or more processors 102 are configured to train at step 204, an auto-encoder using the set of training images, wherein the auto-encoder comprises an encoder and a decoder. In an embodiment of the present disclosure, the one or more processors 102 are configured to generate at step 206, a set of latent embedding from an encoder (302) of the trained auto-encoder. The set of latent embedding comprises a set of shape embedding and a set of color embedding. The set of latent embedding of the auto-encoder are specialized to capture shape and color information of the input. The encoder (E) (302) generates the latent embedding $f \in R^{N \times D}$ of an input image $I \in R^{H \times W \times 3}$, where generation of the latent embedding $f$ is represented as in equation (1). Here, N represents the number of specialized features and D represents the dimension of these features.

$$f = E(I; \theta_E) \qquad (1)$$

where $\theta_E$ represents the parameter of the encoder (302), $f = \{f_{shape}, f_{color}\}$, $f_{shape} = \{f_{LL}, f_{HL}, f_{LH}, f_{HH}\}$ and $\{f_R, f_G, f_B\}$.

Figure 2A:
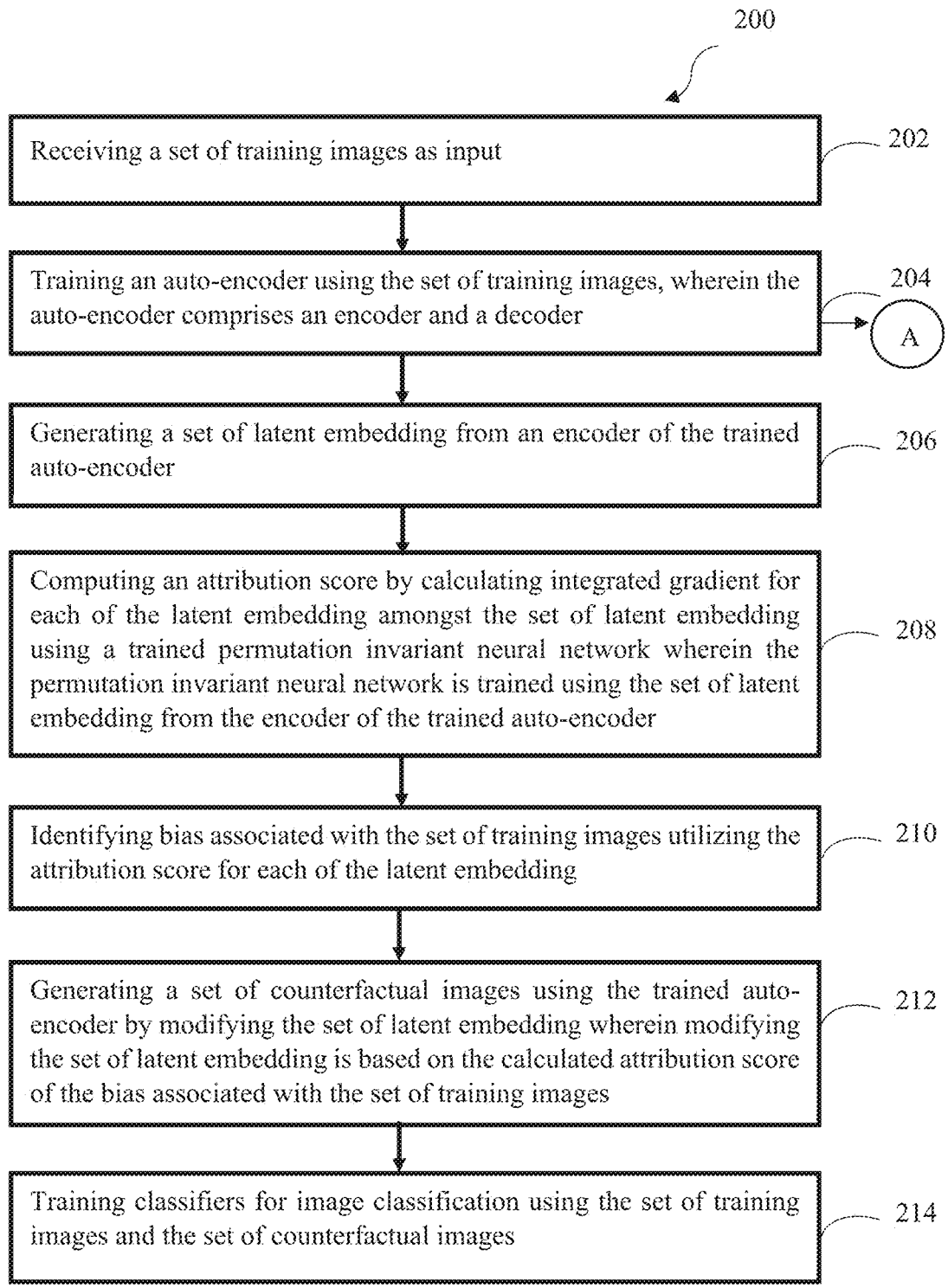
FIG. 2A and FIG. 2B is an exemplary flow diagram depicting steps for a method for identifying and mitigating bias while training deep learning models according to some embodiments of the present disclosure.
Figure 2B:
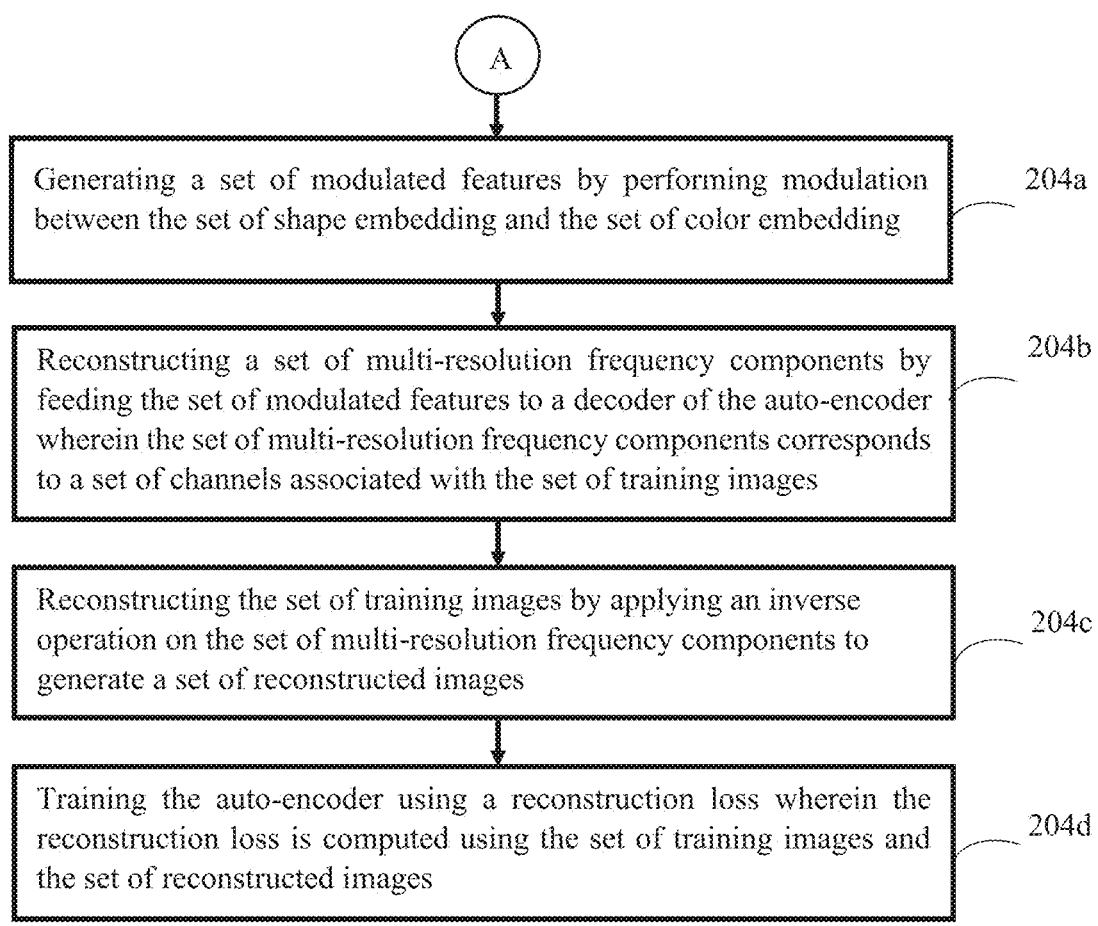

The two main components of the system 100 which is not shown in FIG. 1 are the auto-encoder and a permutation invariant neural network 402. (e.g., a set transformer). FIG. 2B depicts the steps for training the auto-encoder and corresponds to the steps for feature specialization approach for low-level bias identification. At step 204a, the system 100 is configured to generate a set of modulated features by performing modulation between the set of shape embedding and the set of color embedding. The shape embeddings $f_{shape}$ are modulated using the color embeddings $f_R, f_G, f_B$ respectively and is given as below in equation (2), $$f_{shape}^R = \{f_{LL} \odot f_R, f_{HL} \odot f_R, f_{LH} \odot f_R, f_{HH} \odot f_R\}$$

$$f_{shape}^G = \{f_{LL} \odot f_G, f_{HL} \odot f_G, f_{LH} \odot f_G, f_{HH} \odot f_G\}$$

$$f_{shape}^B = \{f_{LL} \odot f_B, f_{HL} \odot f_B, f_{LH} \odot f_B, f_{HH} \odot f_B\} \qquad (2)$$

Here, $\odot$ represents the Hadamard product.

At step 204b, the system 100 is configured to reconstruct a set of multi-resolution frequency components by feeding the set of modulated features to the decoder of the auto-encoder wherein the set of multi-resolution frequency components (e.g., (Discrete Wavelet Transform (DWT) components) corresponds to a set of channels associated with the set of training images. The set of modulated features are fed to the decoder (304) to reconstruct the multi-resolution frequency components corresponding to the different channels of the input image (I). The reconstruction of multi-resolution frequency components is represented as in equation (3) below, $$I_{LL}^x = D_1(f_{LL}^x; \theta_1)$$

$$I_{HL}^x = D_2(f_{HL}^x; \theta_2)$$

$$I_{LH}^x = D_3(f_{LH}^x; \theta_3)$$

$$I_{HH}^x = D_4(f_{HH}^x; \theta_4) \quad (3)$$

where, $x \in \{R, G, B\}$, $\eta_1$, $\theta_2$, $\theta_3$, $\theta_4$ represent the parameters of decoders D1, D2, D3, D4 respectively.

At step 204c, the system 100 is configured to reconstruct the set of training images by applying an inverse operation (e.g., inverse DWT) on the set of multi-resolution frequency components to generate a set of reconstructed images. The below equations, equations (4) and (5), correspond to reconstruction of RGB image using the IDWT module, $$I_{recon}^{RGB} = [I_{recon}^R, I_{recon}^G, I_{recon}^B] \quad (4)$$

$$\text{where } I_{recon}^R = IDWT([I_{LL}^R, I_{HL}^R, I_{LH}^R, I_{HH}^R])$$

$$I_{recon}^G = IDWT([I_{LL}^G, I_{HL}^G, I_{LH}^G, I_{HH}^G])$$

$$I_{recon}^B = IDWT([I_{LL}^B, I_{HL}^B, I_{LH}^B, I_{HH}^B]) \quad (5)$$

At step 204d, the system 100 is configured to train the auto-encoder using a reconstruction loss wherein the reconstruction loss (e.g., L2 or Mean Square Error) is computed using the set of training images and the set of reconstructed images. The auto-encoder is trained in an end-end manner with $\|\cdot\|_2^2$ loss between the set of training images and the set of reconstructed images and is provided in equation (6).

$$\mathcal{L}_{recon} = \|I - I_{recon}^{RGB}\|_2^2 \quad (6)$$

Figure 3:
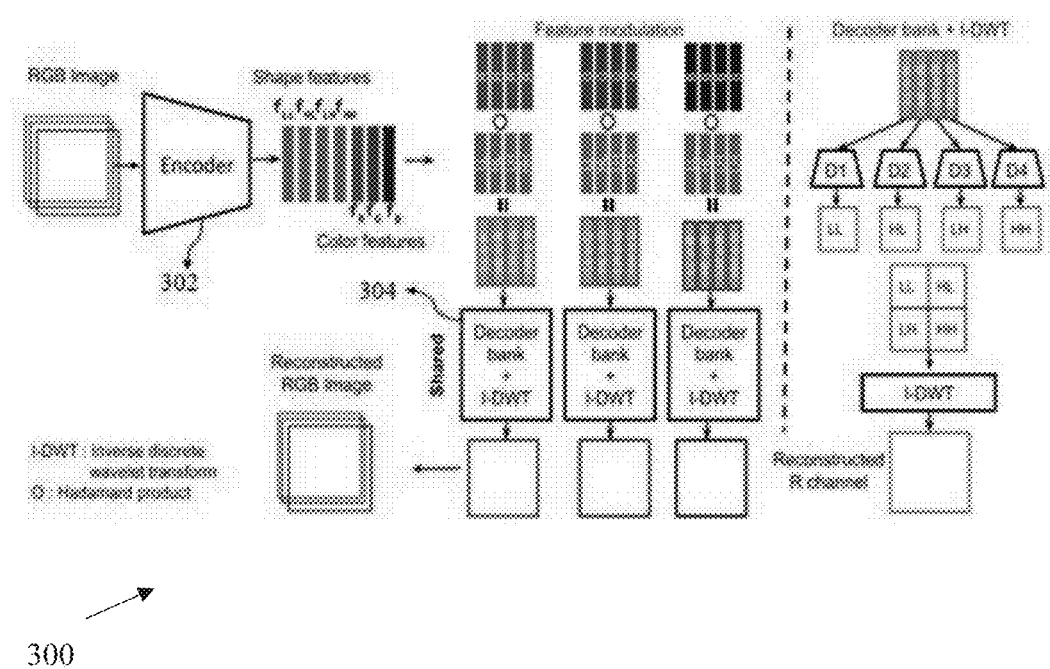
FIG. 3 illustrates a schematic diagram for feature specialization for identifying and mitigating bias while training deep learning models according to some embodiments of the present disclosure.

FIG. 3 illustrates a schematic diagram for feature specialization for bias identification while training deep learning models according to some embodiments of the present disclosure. FIG. 3 illustrates the schematic diagram of the steps explained from steps 204a to steps 204d of FIG. 2B.

In an embodiment of the present disclosure, the one or more processors 102 are configured to compute at step 208, an attribution score by calculating integrated gradient for each of the latent embedding amongst the set of latent embedding using a trained permutation invariant neural network wherein the permutation invariant neural network is trained using the set of latent embedding from the encoder of the trained auto-encoder. Post-training of the auto-encoder, the decoder is discarded, and the parameters of the encoder are frozen. The set of latent embedding are considered as a set of specialized features and the permutation-invariant neural network 402 (e.g., a set transformer) is trained for the image classification task, with the set of latent embedding as input. Latent embedding of an image is fed to the permutation invariant neural network to obtain the class scores. A method such as integrated gradient (IG) computes the attribution score of the latent embedding by considering the class score. The integrated gradient for each of the latent embedding is calculated using the trained permutation invariant neural network 402. After training the permutation invariant neural network, the importance of each feature is determined for the classification task at the instance level using the integrated gradients (IG) approach. Integrated gradient $(ig \in R^{N \times D})$ of the latent embedding $f$ corresponding to the image I is given by ig=IG(ST($f$),y) where, ig={$ig_{LL}$, $ig_{HL}$, $ig_{LH}$, $ig_{HH}$}. The L2 norm of the IGs corresponding to the individual components are computed and normalized as shown in below equation (7), $$\phi^N = \{\phi_{LL}^N, \phi_{HL}^N, \phi_{LH}^N, \phi_{HH}^N\} \text{ where,} \quad (7)$$

$$\phi_{LL}^N = \frac{\phi_{LL}}{\phi_{LL} + \phi_{HL} + \phi_{LH} + \phi_{HH}}$$

$$\phi_{LL} = \|ig_{LL}\|_2$$

Normalized IG values are aggregated category wise and corresponding bar plots are obtained, wherein these bar plots are referred as IG plots. These IG plots are used in determining the bias present in the dataset.

In an embodiment of the present disclosure, the one or more processors 102 are configured to identify at step 210, bias associated with the set of training images utilizing the attribution score for each of the latent embedding. The bias associated with the set of training images comprises detecting a set of specialized features resulting in the bias from the attribution score calculated using integrated gradients.

In an embodiment of the present disclosure, the one or more processors 102 are configured to generate at step 212, a set of counterfactual images using the trained auto-encoder by modifying the set of latent embedding wherein modifying the set of latent embedding is based on the bias associated with the set of training images. The set of counterfactual images are generated by the trained auto-encoder via modification of the latent embedding. From the normalized IG plots obtained using the disclosed bias identification method, the specialized features towards which the permutation invariant neural network is biased for making predictions are detected. Using this information, the counterfactual images are generated by modification of latent embedding corresponding to the detected biased features using the trained auto-encoder.

Figure 4:
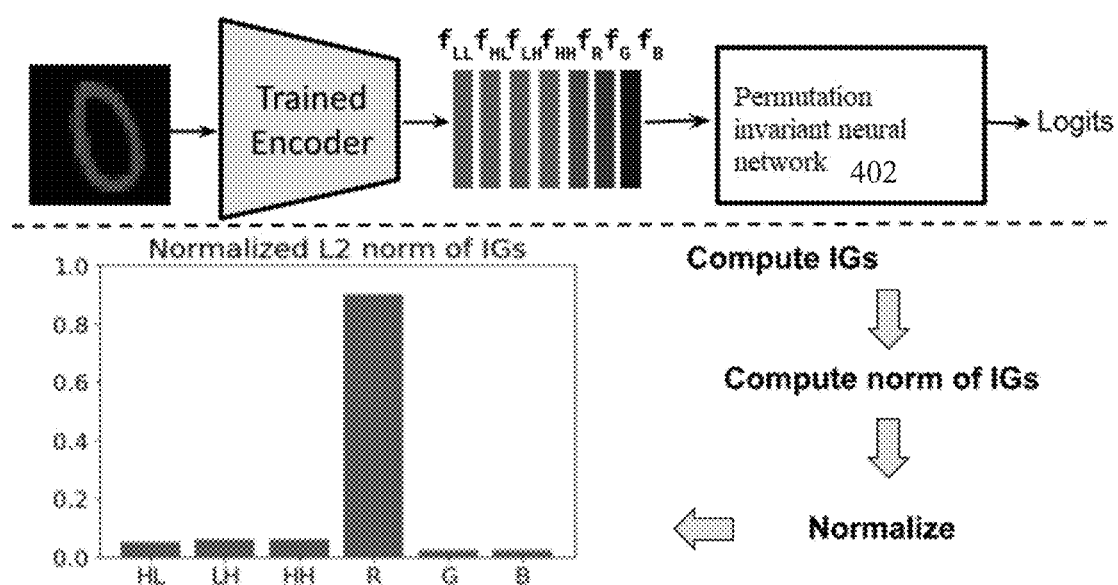
FIG. 4 illustrates a flow diagram for training a permutation invariant neural network followed by computation of integrated gradients with respect to latent embeddings according to some embodiments of the present disclosure.

In an embodiment of the present disclosure, the one or more processors 102 are configured to train at step 214, classifiers for image classification using the set of training images and the set of counterfactual images. For de-biasing, the network is trained with mini-batches containing original images and its counterfactual images. FIG. 4 illustrates a flow diagram for training a permutation invariant neural network followed by computation of integrated gradients with respect to the set of latent embedding according to some embodiments of the present disclosure. FIG. 4 illustrates the flow diagram of the steps explained from step 206 to step 212 of FIG. 2A. The block 402 is the permutation invariant neural network utilized to calculate the integrated gradient for each of the latent embedding.

EXPERIMENTAL RESULTS: The ColorMNIST dataset, which is a popular confounded dataset has been used for experimentation of the disclosed method. The dataset consists of 10-digit classes with varying colors of digits. For experimentation the ColorMNIST data with a specific variance has been used wherein for adding color bias, a set of 10 mean colors are chosen. Subsequently, a random color is sampled from the normal distribution of the selected mean color and specific variance. Greater the variance, the lesser will be the bias present. For the training set, for every digit class, a specific mean color is selected whereas for the test set, for a given digit, the mean color is randomly chosen from specified mean colors. The variance is varied from 0.02 to 0.05 with a 0.005 interval. In addition to using this dataset, another ColorMNIST dataset with 0 variance was created where instead of sampling from the normal distribution of specified variance, each digit was colorized with corresponding mean colors. A very strong bias is present in the case of the 0 variance dataset. There are 60000 training images and 10000 test images in ColorMNIST dataset. Another toy dataset referred as BiasedShape dataset was created. This dataset consists of different shape classes with varying patterns in the background. The shape classes include square, triangle and circle categories. Each shape can have a unique background which includes diagonal, vertical and horizontal patterns. Similar to ColorMNIST, this dataset is also confounded where each shape class in the training dataset has a specific background, whereas in the test set background patterns are shuffled for all shape classes. Two variants of this dataset referred as BiasedShape-2 and BiasedShape-3 were created. In BiasedShape-2, two classes namely square and rectangle with varying colors and sizes were considered. In the training set, all the squares have horizontal patterns in the background and all the rectangles have vertical patterns in the background. Whereas in the test set the background is shuffled, that is, both square and rectangle can either have horizontal or vertical background patterns. To extend this for more variations of shapes and patterns, the BiasedShape-3 dataset was introduced, where three classes namely square, circle and triangle with varying colors and sizes were considered. In the training set, all the squares have diagonal patterns in background, circles have vertical patterns in the background and triangles have horizontal patterns in the background. Whereas in the test set the background patterns are shuffled. The BiasedShape-2 dataset contains 4000 images and BiasedShape-3 contains 6000 images in train set and test sets.

For implementation, the architecture of the backbone neural network, which is used in the encoder of the disclosed feature specialization is shown in Table 1.

TABLE 1

| Layer | Configuration | Input | Output |
|---|---|---|---|
| Conv + ReLu | 32, 3 × 3 filters | [28, 28, 3] | [28, 28, 32] |
| Avg Pool | 2 × 2 | [28, 28, 32] | [14, 14, 32] |
| Conv + ReLu | 63, 3 × 3 filters | [14, 14, 32] | [14, 14, 63] |
| Avg Pool | 2 × 2 | [14, 14, 63] | [7, 7, 63] |

For implementation of the disclosed method the same backbone neural network as shown in Table 1 was used in the case of CMNIST and BiasedShape datasets. However, other backbone neural networks, such as Resnet-18 can also be used for complex datasets.

As shown in Table 1, the output of backbone neural network is of dimension 7×7×63. This means 63 feature maps of dimension 7×7 are obtained. These are divided into 7 groups each having 9 feature maps. Here, each group of features corresponding to $f_{LL}, f_{HL}, f_{LH}, f_{HH}, f_R, f_G, f_B$ are specialized to capture shape and color features. The set of features corresponding to DWT components are fed to the Dense layers with 32 neurons followed by ReLu activation function to get shape features $f_{shape} \in R^{4 \times 32}$. The set of features corresponding to R, G and B are fed to Dense layers with 1 neuron followed by ReLu. 1 neuron is enough to capture the color information, and this will prevent the network to learn shape information from spatial computations. The color neuron's output is then repeated 32 times to get color feature of dimension to get $f_{color} \in R^{3 \times 32}$. Both the color and shape features are concatenated to obtain $f \in R^{7 \times 32}$, which is the output of the encoder.

The shape embedding $f_{shape}$ are then modulated using color embedding $f_{color}$ and fed to the decoders, D1, D2, D3 and D4 as before. All the decoders share the same architecture that is two consecutive Dense layers where Dense1 has 512 neurons followed by ReLu activation and Dense2 has 196 neurons. The output of the last dense layer is reshaped to dimension 14×14. The output of these decoders is then fed to the Inverse DWT module to reconstruct the input image $I_{recon}$ of dimension 28×28×3. The auto-encoder is trained in an end-to-end manner for 50 epochs by minimizing the L2 loss between the input image and reconstructed image. Adam optimizer is used for training with a learning rate of 0.0001, weight decay of 0.0005 and batch size of 32.

The training strategy of autoencoder ensures that the encoder part of the trained auto-encoder gives disentangled shape $f_{shape}$ and color $f_{color}$ features. In order to show that color and shape features obtained from the trained encoder are disentangled, we perform interpolation of color and shape embeddings of input and target images. In case of color interpolation, the color embedding of transformed images is obtained by taking convex combination of color embeddings of input and target images and shape embedding of transformed image is kept same as that of shape embedding of input image. The obtained color and shape embedding of transformed image is used to reconstruct color transformed image corresponding to input image. Similarly, to change the shape of input image without changing its color, manipulate the shape embedding keeping color embedding same. Mathematically, the equations for obtaining shape $f_{shape}$ and color $f_{color}$ features of transformed image are shown in equation (8) and equation (9).

$$f_{shape}=(1-i)*f_{shape-input}+i*f_{shape-target} \qquad (8)$$

$$f_{color}=(1-j)*f_{color-input}+j*f_{color-target} \qquad (9)$$

The color transformation from input to target is obtained by keeping i as 0 and varying j from 0 to 1 in intervals of 0.1, whereas shape transformation from input to target is obtained by varying i from 0 to 1 in intervals of 0.1 and keeping j as 0.

Figure 5A:
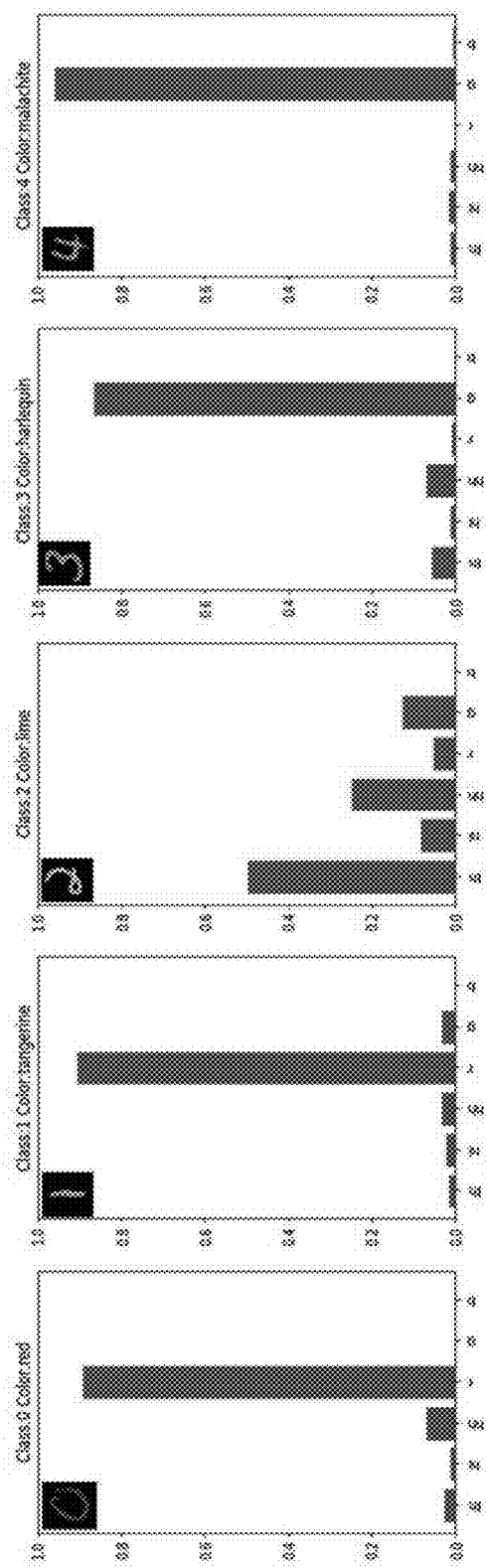
FIG. 5A and FIG. 5B depicts a graphical representation of normalized integrated gradients for each class of ColorMNIST dataset according to some embodiments of the present disclosure.
Figure 5B:
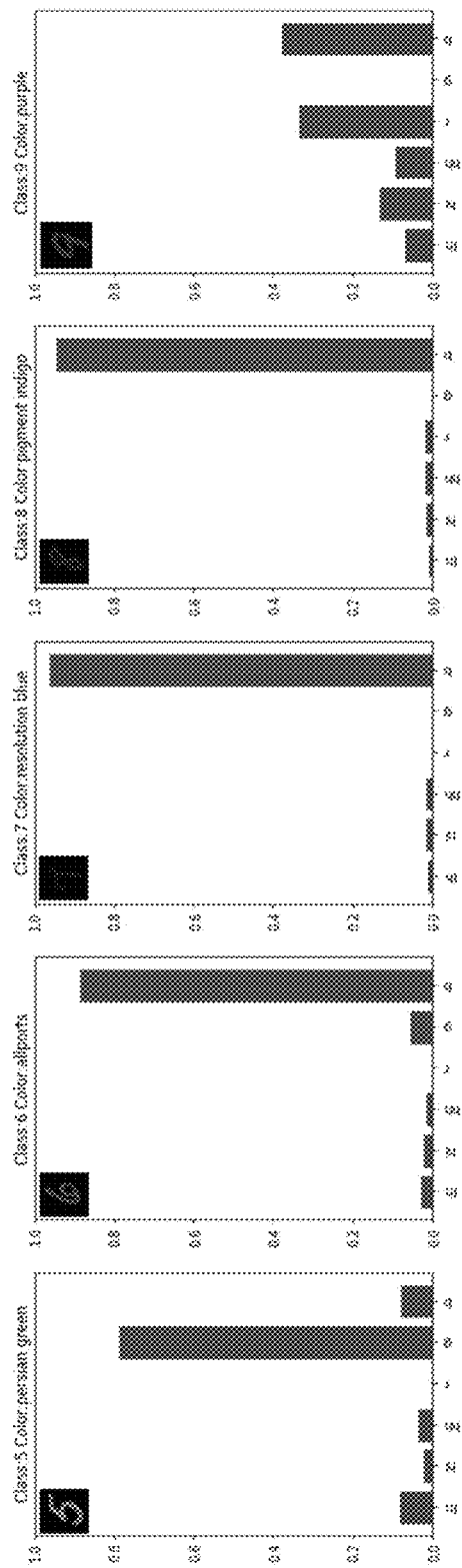
Figure 6:
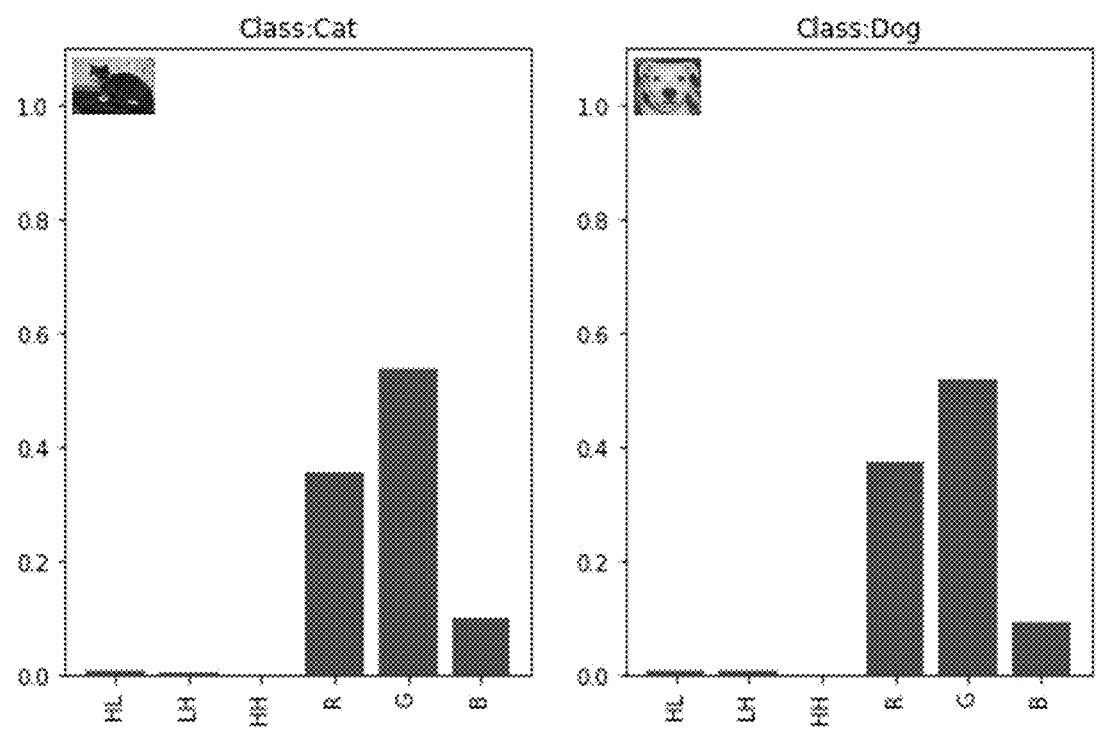
FIG. 6 depicts a graphical representation of normalized integrated gradients for cats and dogs dataset according to some embodiments of the present disclosure.
Figure 7A:
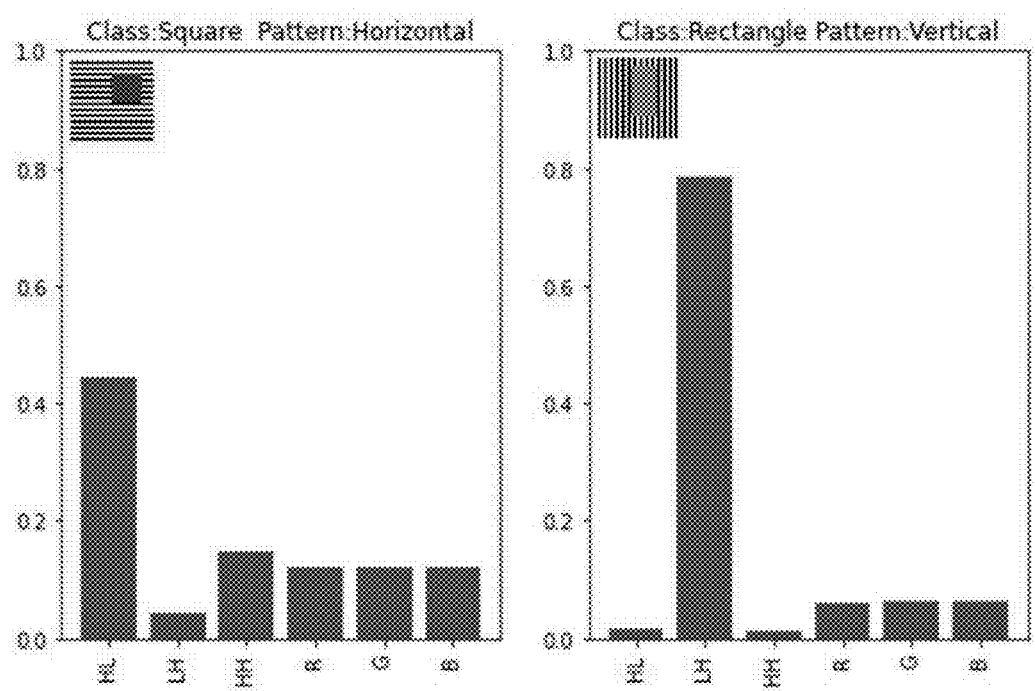
FIG. 7A and FIG. 7B depicts a graphical representation of normalized integrated gradients for each class of Biased-Shape dataset according to some embodiments of the present disclosure.
Figure 7B:
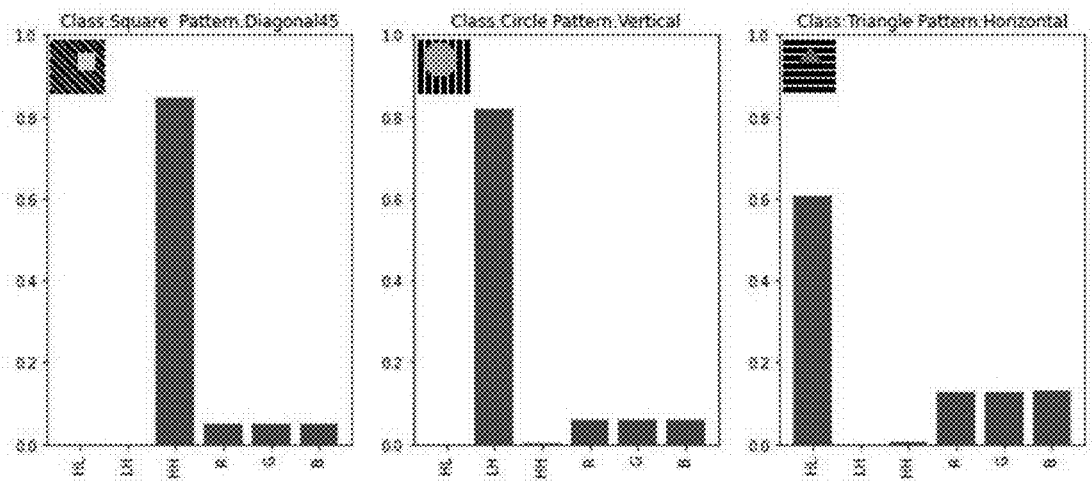

From the trained encoder, the set of specialized features $f \in R^{7 \times 32}$ are obtained, which are used to train a permutation invariant neural network (e.g., set transformer) for the image classification task. The permutation invariant neural network is trained by minimizing the cross-entropy loss between the ground-truth class labels and the predicted logits. The input to the permutation invariant neural network is a set of 7 specialized features of 32 dimension. The training of the set transformer is done for 20 epochs using Adam optimizer with a learning rate of 0.0001, weight decay of 0.0005 and batch size of 32. After training the permutation invariant neural network, the importance of each feature for the classification task is estimated using the Integrated Gradients (IGs) explanation method. The normalized IGs obtained using training samples of ColorMNIST dataset and BiasedShape dataset are shown in FIG. 5A, FIG. 5B, FIG. 7A and FIG. 7B. FIG. 5A and FIG. 5B depicts a graphical representation of normalized integrated gradients for each class of ColorMNIST dataset according to some embodiments of the present disclosure. FIG. 7A and FIG. 7B depicts a graphical representation of normalized integrated gradients for each class of BiasedShape dataset according to some embodiments of the present disclosure. The experiment is repeated for the Dogs and Cats dataset with ResNet-18 as backbone. In this case, the training data consists of dark cats and bright dogs. The IGs for Dogs and Cats dataset is shown in FIG. 6. FIG. 6 depicts a graphical representation of normalized integrated gradients for cats and dogs dataset according to some embodiments of the present disclosure.

For de-biasing, the neural network-based classifier is trained with original images and its counterfactual images. For BiasedShape-2 the counterfactuals images are generated by shuffling LH and HL components of latent embedding and for BiasedShape-3 it is generated by shuffling LH, HL and HH randomly as these components are peaking as determined by the IGs. For experimentation, the backbone neural network given in Table 1 is used followed by two Dense layers for the task of classification. Dense layer-1 has 512 neurons with ReLu activation and Dense layer-2 has neurons equal to number of classes. The test accuracy for both ColorMNIST with zero variance (CMNIST-0) and BiasedShape dataset when training the backbone neural network normally is given in Table 2, which shows that the base network performs very poorly on the biased dataset. Even when all the specialized features (both color and shape features) are used given by the auto-encoder for classification using a set transformer, the results are not improving much. A popular baseline of de-biasing is trained which uses an adversarial setup for both datasets. Although there exists improvement in results, but mitigation of bias by training the backbone network using counterfactual images results in maximum improvement as can be observed from Table 2. The same experiment is repeated for ColorMNIST data with variance and the results are shown in Table 3. It is observed that the disclosed method gives comparable performance as compared to the recent state-of-the-art, which uses bias labels for training. In the disclosed method, it was able to de-bias even without knowing the bias labels apriori.

TABLE 2

| Methods | CMNIST-0 | BiasedShape-2 |
| --- | --- | --- |
| Backbone Network | 11.29% | 49.95% |
| Set Transformer | 14.09% | 49.95% |
| Adversarial Debiasing | 55.82% | 63.86% |
| Debiasing (our approach) | 95.1% | 97.15% |

TABLE 3

| | ColorMNIST-variance | | | | | | |
| --- | --- | --- | --- | --- | --- | --- | --- |
| Methods | 0.02 | 0.025 | 0.03 | 0.035 | 0.04 | 0.045 | 0.05 |
| Baseline (ERM) | 0.476 | 0.542 | 0.664 | 0.720 | 0.785 | 0.838 | 0.870 |
| Prior Method 1 | 0.864 | 0.925 | 0.959 | 0.973 | 0.975 | 0.980 | 0.982 |
| Prior Method 2 | 0.943 | 0.961 | 0.970 | 0.980 | 0.981 | 0.982 | 0.985 |
| Disclosed Method (trained on data without var) | 0.953 | 0.953 | 0.952 | 0.952 | 0.952 | 0.954 | 0.954 |
| Disclosed Method (trained on data with var) | 0.941 | 0.956 | 0.958 | 0.968 | 0.976 | 0.978 | 0.980 |
| Disclosed Method (fine-tuned on model without var) | 0.943 | 0.957 | 0.956 | 0.968 | 0.976 | 0.976 | 0.978 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:
   receiving, via one or more hardware processors, a set of training images as input;
   training, via the one or more hardware processors, an auto-encoder using the set of training images, wherein the auto-encoder comprises an encoder and a decoder;
   generating, via the one or more hardware processors, a set of latent embeddings from an encoder of the trained auto-encoder;
   computing, via the one or more hardware processors, an attribution score by calculating integrated gradient for each of the latent embeddings amongst the set of latent embeddings using a trained permutation invariant neural network, wherein the permutation invariant neural network is trained using the set of latent embeddings from the encoder of the trained auto-encoder;
   identifying, via the one or more hardware processors, bias associated with the set of training images utilizing the attribution score for each of the latent embeddings;
   generating, via the one or more hardware processors, a set of counterfactual images using the trained auto-encoder by modifying the set of latent embeddings, wherein modifying the set of latent embedding is based on the calculated attribution score of the bias associated with the set of training images; and
   training, via the one or more hardware processors, classifiers for image classification using the set of training images and the set of counterfactual images.

2. The method as claimed in claim 1, wherein the set of latent embeddings comprises a set of shape embeddings and a set of color embeddings.

3. The method as claimed in claim 1, wherein the training of the auto-encoder comprises:
   generating, via the one or more hardware processors, a set of modulated features by performing modulation between the set of shape embeddings and the set of color embeddings;
   reconstructing, via the one or more hardware processors, a set of multi-resolution frequency components by feeding the set of modulated features to a decoder of the auto-encoder wherein the set of multi-resolution frequency components corresponds to a set of channels associated with the set of training images;
   reconstructing the set of training images, via the one or more hardware processors, by applying an inverse operation on the set of multi-resolution frequency components to generate a set of reconstructed images; and
   training, via the one or more hardware processors, the auto-encoder using a reconstruction loss wherein the reconstruction loss is computed using the set of training images and the set of reconstructed images.

4. The method as claimed in claim 1, wherein the step of identifying the bias associated with the set of training images comprises detecting a set of specialized features resulting in the bias from the attribution score calculated using integrated gradients.

5. A system, comprising:
   a memory storing instructions;
   one or more communication interfaces; and
   one or more hardware processors coupled to the memory via the one or more communication interfaces, wherein the one or more hardware processors are configured by the instructions to:
   receive a set of training images as input;
   train an auto-encoder using the set of training images, wherein the auto-encoder comprises an encoder and a decoder;
   generate a set of latent embeddings from an encoder of the trained auto-encoder;
   compute an attribution score by calculating integrated gradient for each of the latent embeddings amongst the set of latent embeddings using a trained permutation invariant neural network, wherein the permutation invariant neural network is trained using the set of latent embeddings from the encoder of the trained auto-encoder;
   identify bias associated with the set of training images utilizing the attribution score for each of the latent embeddings;
   generate a set of counterfactual images using the trained auto-encoder by modifying the set of latent embeddings, wherein modifying the set of latent embeddings is based on the calculated attribution score of the bias associated with the set of training images; and
   train classifiers for image classification using the set of training images and the set of counterfactual images.

6. The system as claimed in claim 5, wherein the set of latent embeddings comprises a set of shape embeddings and a set of color embeddings.

7. The system as claimed in claim 5, wherein the one or more hardware processors are configured to train the auto-encoder by,
   generate a set of modulated features by performing modulation between the set of shape embeddings and the set of color embeddings;
   reconstruct a set of multi-resolution frequency components by feeding the set of modulated features to a decoder of the auto-encoder wherein the set of multi-resolution frequency components corresponds to a set of channels associated with the set of training images;

reconstruct the set of training images by applying an inverse operation on the set of multi-resolution frequency components to generate a set of reconstructed images; and train the auto-encoder using a reconstruction loss wherein the reconstruction loss is computed using the set of training images and the set of reconstructed images.

8. The system as claimed in claim 5, wherein the one or more hardware processors are configured to identify the bias associated with the set of training images by detecting a set of specialized features resulting in the bias from the attribution score calculated using integrated gradients.

9. One or more non-transitory machine-readable information storage mediums comprising one or more instructions which when executed by one or more hardware processors cause:

receiving a set of training images as input;

training an auto-encoder using the set of training images, wherein the auto-encoder comprises an encoder and a decoder;

generating a set of latent embeddings from an encoder of the trained auto-encoder;

computing an attribution score by calculating integrated gradient for each of the latent embeddings amongst the set of latent embeddings using a trained permutation invariant neural network, wherein the permutation invariant neural network is trained using the set of latent embeddings from the encoder of the trained auto-encoder;

identifying bias associated with the set of training images utilizing the attribution score for each of the latent embeddings;

generating a set of counterfactual images using the trained auto-encoder by modifying the set of latent embeddings, wherein modifying the set of latent embeddings is based on the calculated attribution score of the bias associated with the set of training images; and training classifiers for image classification using the set of training images and the set of counterfactual images.

10. The one or more non-transitory machine-readable information storage mediums of claim 9, wherein the set of latent embeddings comprises a set of shape embeddings and a set of color embeddings.

11. The one or more non-transitory machine-readable information storage mediums of claim 9, wherein the training of the auto-encoder comprises:

generating a set of modulated features by performing modulation between the set of shape embeddings and the set of color embeddings;

reconstructing a set of multi-resolution frequency components by feeding the set of modulated features to a decoder of the auto-encoder wherein the set of multi-resolution frequency components corresponds to a set of channels associated with the set of training images;

reconstructing the set of training images by applying an inverse operation on the set of multi-resolution frequency components to generate a set of reconstructed images; and training the auto-encoder using a reconstruction loss wherein the reconstruction loss is computed using the set of training images and the set of reconstructed images.

12. The one or more non-transitory machine-readable information storage mediums of claim 9, wherein the step of identifying the bias associated with the set of training images comprises detecting a set of specialized features resulting in the bias from the attribution scare calculated using integrated gradients.

* * * * *